United States Patent
Lair

(10) Patent No.: US 9,554,349 B2
(45) Date of Patent: Jan. 24, 2017

(54) MOBILE RADIO COMMUNICATIONS SIGNALING

(75) Inventor: Yannick Lair, Berkshire (GB)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 14/009,523

(22) PCT Filed: Apr. 4, 2012

(86) PCT No.: PCT/JP2012/059836
§ 371 (c)(1),
(2), (4) Date: Oct. 2, 2013

(87) PCT Pub. No.: WO2012/137978
PCT Pub. Date: Oct. 11, 2012

(65) Prior Publication Data
US 2014/0024371 A1    Jan. 23, 2014

(30) Foreign Application Priority Data
Apr. 6, 2011  (GB) .................................. 1105854.2

(51) Int. Cl.
*H04W 60/00*    (2009.01)
*H04W 48/08*    (2009.01)
(Continued)

(52) U.S. Cl.
CPC ............. *H04W 60/00* (2013.01); *H04W 48/08* (2013.01); *H04W 76/027* (2013.01);
(Continued)

(58) Field of Classification Search
CPC ........ H04W 60/00; H04W 68/02; H04L 12/56
See application file for complete search history.

(56) References Cited

U.S. PATENT DOCUMENTS

2009/0252132 A1* 10/2009 Song ................... H04W 76/025
                                                             370/338
2011/0235614 A1*  9/2011 Lerzer et al. ................. 370/331
(Continued)

FOREIGN PATENT DOCUMENTS

EP    2315470 A1    4/2011
GB    2464137 A     4/2010
(Continued)

OTHER PUBLICATIONS

International Search Report of PCT/JP2012/059836 mailed Jul. 10, 2012 and Written Opinion of the International Search Authority of PCT/JP2012/059836 mailed Jul. 10, 2012, (5 pages).
(Continued)

*Primary Examiner* — Myron K Wyche
(74) *Attorney, Agent, or Firm* — Wilmer Cutler Pickering Hale and Dorr LLP

(57) ABSTRACT

The present invention relates to a mobile radio communications network device operative to transmit a non-access stratum (NAS) signal to a mobile radio communications device after a failed attempt by said mobile radio communications device to access a mobile radio communications network via said network device, said network device being arranged to include within said NAS signal information indicating to said mobile radio communications device which one of: (i) an existing NAS signalling connection; or (ii) a new NAS signalling connection, said radio mobile communications device should employ to attempt re-establishment of connection with said network device. The present invention also relates to a NAS signal to be employed by such a network device, a mobile radio communications device for exchanging signalling with the network device and related methods of such devices.

16 Claims, 5 Drawing Sheets

(51) Int. Cl.
  *H04W 74/00* (2009.01)
  *H04W 76/02* (2009.01)
  *H04W 76/04* (2009.01)

(52) U.S. Cl.
  CPC .......... *H04W 74/00* (2013.01); *H04W 76/028* (2013.01); *H04W 76/041* (2013.01)

(56) References Cited

U.S. PATENT DOCUMENTS

| | | | | |
|---|---|---|---|---|
| 2012/0063300 A1* | 3/2012 | Sahin | .................... | H04W 36/12 370/225 |
| 2013/0150024 A1* | 6/2013 | Burbidge | .............. | H04W 24/04 455/423 |
| 2014/0038647 A1* | 2/2014 | Zhang | ................. | H04W 68/005 455/458 |

FOREIGN PATENT DOCUMENTS

| | | |
|---|---|---|
| JP | 2006-121246 A | 5/2006 |
| WO | WO 2010/037053 A1 | 4/2010 |

OTHER PUBLICATIONS

GB Search Report 1105854.2 mailed Aug. 5, 2011 (2 pages).
3GPP TS 24.008 V10.2.0 (Mar. 2011) (634 pages)—3$^{rd}$ Generation Partnership Project; Technical Specification Group Core Network and Terminals; Mobile Radio Interface Layer 3 Specification; Core Network Protocols; Stage 3 (Release 10) (634 pages).
3GPP TS 24, 301 V10.2.0 (Mar. 2011)—3$^{rd}$ Generation Partnership Project; Technical Specification Group Core Network and Terminals; Non-Access-Stratum (NAS) Protocol for Evolved Packet System (EPS); Stage 3 (Release 10) (315 pages).
NEC, NTT DOCOMO, Panasonic, Handling of re-attach following TAU reject or Service Request reject, 3Gpp TSG CT WG1 Meeting #71, C1-111700, 3GPP, May 2, 2011 (6 pages).
NEC, LS on Automatic re-attach following TAU reject or Service Request reject, 3GPP TSG RAN WG 5 Meeting #50, R5-110835, 3GPP, Feb. 25, 2011 (1 page).
Japanese Office Action corresponding to Japanese Application No. 2013-543426, dated Sep. 24, 2015, 4 pages.
Extended European Search Report corresponding to European Application No. 12767751.6, dated Oct. 20, 2015, 7 pages.
Motorola Mobility "GCF Priority 2-Correction to EMM Test Case 9.3.1.7", 3GPP TSG-RAN WG5 Meeting #50, R5-110775, Taipei, Feb. 21-25, 2011 (retrieved Mar. 9, 2011), 4 pages.

* cited by examiner

MOBILE RADIO COMMUNICATIONS SIGNALING

CROSS-REFERENCE TO RELATED APPLICATIONS

This application is a national stage application of International Application No. PCT/JP2012/059836 entitled "Mobile Radio Communications Signaling," filed on Apr. 4, 2012, which claims the benefit of the priority of U.K. patent application No. 1105854.2, filed on Apr. 6, 2011, the disclosures of each of which are hereby incorporated by reference in their entirety.

TECHNICAL FIELD

The present invention relates to mobile radio communications signalling and, in particular, to a mobile radio communications device, and a mobile radio communications network device arranged to transmit and receive signalling for the establishment/maintenance of network connections and to a signal containing an indication of how re-establishment of network connections are to be attempted in the case of loss of network connection between the mobile radio communications device and the mobile radio communications network device.

Priority is claimed on UK Patent Application No. 1105854.2, filed Apr. 6, 2011, the content of which is incorporated herein by reference.

BACKGROUND ART

The functionality afforded mobile radio communication devices such as cell phone handsets has been increasingly defined by reference to the Third Generation Partnership Protocol (3GPP) proposals and standards and which has focused most recently upon ongoing improvements to the Universal Mobile Telecommunications System (UMTS) such as the Long Term Evolution (LTE) ongoing improvement thereto.

In order to access services in 3GPP networks, mobile radio communications device User Equipment (UE) need to be registered to the network. Once the UE has been registered with a network, session information for the UE of an active session is maintained in a context for the UE.

In some circumstances, the session information of the active session maintained in the context may be lost or become unrecoverable. This can occur, for example, due to inter-node mobility, or because the network has implicitly detached the UE due to there being no communication from the UE to the network for a period of time. In these instances, when the UE attempts to access the network, using, for example, a registration request such as a tracking area update (TAU) request in LTE systems, or a routing area update (RAU) request in UMTS systems, or a service request in LTE or UMTS systems, the network will reject the request from the UE indicating a specific cause for the rejection to the UE. Upon reception of a signal from the network indicating the specific cause for rejection, the UE may attempt to re-establish connection with the network (or "re-attach" to the network).

Examples of causes for rejection of a request in LTE systems are as follows:

Cause #9—UE identity cannot be derived by the network.
This Evolved Packet System Mobility Management (EMM) cause is sent to the UE when the network cannot derive the identity of the UE from the Globally Unique Temporary Identity (GUTI)—S-Temporary Mobile Subscriber Identity (S-TMSI)—P-TMSI and RAI (Routing Area Identity), e.g. no matching identity/context in the network or failure to validate the identity of the UE due to integrity check failure of the received message.

Cause §10—Implicitly detached.
This EMM cause is sent to the UE either if the network has implicitly detached the UE, e.g. after the implicit detached time has expired, or if the EMM context data related to the subscription does not exist in the Mobility Management Entities (MME)T e.g. because of a MME restart.

In UE which can support LTE and Universal Mobile Telecommunications System (UMTS), there may be instances where the UE is initially operating under UMTS but then transfers to LTE. In such instances, when the UE transfers from UMTS to LTE with no Packet Data Protocol (PDP) context established, the network will reject a tracking area update request from the UE in order to initiate an attempt by the UE to re-establish connection with the network ("new attach"). This new attach triggers the establishment of a default bearer which is necessary in LTE systems.

In this instance, an example of a cause for rejection of a request is as follows:

Cause #40—No EPS bearer context activated.
This EMM cause is sent to the UE, if during a tracking area updating procedure the MME detects that there is no active EPS bearer context in the network.

As noted above, when the UE receives a rejection to its request to access the network, the reason for the rejection (i.e. "cause") is indicated to the UE. The type of causes of rejection will depend upon the request sent by the UE to the network (e.g. causes #9 or #10 or #40 during TAU procedures in LTE systems, or causes #9 or #10 during service request procedures in LTE systems, or causes #9 or #10 during RAU procedures in GSM/UMTS systems, or causes #9 or #10 during service request procedures in UMTS systems). Upon receipt of the rejection and indication of the cause, the UE is operative to attempt a re-attach with the network.

The re-attach process may be undertaken using a non-access stratum (NAS) signalling connection. Some current network systems require UE to implement the re-attach process using an existing NAS signalling connection. However, other current network systems require UE to implement the re-attach process using a new NAS signalling connection once the existing NAS signalling connection has been released by the network. Also, some current UE re-use an existing NAS signalling connection as part of the re-attach process, whilst some other current UE await release of the existing NAS signalling connection before implementing the re-attach process using a new NAS signalling connection.

There may be delays in re-establishing connection between UE and the network in situations where network systems and UE implement one of the re-attach processes described above. Particular examples of situations in which delays can occur are illustrated in FIGS. 1 and 2, which are discussed briefly below, but are described in more detail later.

FIG. 1 illustrates a schematic process flow for a first situation in which a delay can occur in a re-attach process. In this first situation, a UE is operative to implement a re-attach process using an existing NAS signalling connection. Thus, after receiving from a network device a rejection in response to an attempt by the UE to access the network, the UE sends a request to the network device for re-establishment of connection. However, at around the same time, the network releases the NAS signalling connection. Thus, the request for re-establishment of connection, which is sent by the UE during the re-attach process, is not received by the network device because the NAS signalling connection was released by the network device before the request reached the network device. The UE, having not received any acknowledgement from the network device, will determine that the NAS signalling connection has been released by the network device. Upon such determination, the UE is operative to initiate a timer. The UE postpones the re-attach until a predetermined amount of time (e.g. 15 seconds), as measured by the timer, has elapsed. When the predetermined amount of time has elapsed, the UE initiates establishment of a new NAS signalling connection with the network device, and then is operative to attempt the re-attach process using the new NAS signalling connection. The time between an initial attempt at re-establishment of connection and a subsequent attempt introduces a delay into the re-attach process.

FIG. 2 illustrates a schematic process flow for a second situation in which a delay can occur in a re-attach process. In this second situation, a UE is operative to implement a re-attach process using a new NAS signalling connection. Thus, after receiving from a network device a rejection in response to an attempt by the UE to access the network, the UE waits for the network device to release the existing NAS signalling connection (because it is not operative to use the existing NAS signalling connection). However, the network device may not be configured to release the NAS signalling connection because it is operative to receive a request for re-establishment of connection via the same existing NAS signalling connection. The existing NAS signalling connection may eventually be released locally by the UE. For example, a guard timer in the UE may be started when the rejection from the network device is received by the UE. When the guard timer denotes that a predetermined amount of time has elapsed, the UE is operative to locally release the existing NAS signalling connection. Once the existing NAS signalling connection has been released, the UE is operative to establish a new NAS signalling connection with the network device. The UE can then attempt the re-attach process using the new NAS signalling connection. Again, the time between an initial attempt at re-establishment of connection and a subsequent attempt introduces a delay into the re-attach process.

The above-described examples illustrate the different implementations which exist with regards to the usage of an existing NAS signalling connection or otherwise during a re-attach process.

DISCLOSURE OF INVENTION

The present invention seeks to provide a re-attach process offering advantages over known processes and, in particular, to a mobile radio communications network device, and a mobile radio communications device, arranged to implement such a re-attach process in a manner exhibiting advantages over known devices, and to related methods of operating.

According to an aspect of the present invention, there is provided a mobile radio communications network device operative to transmit a non-access stratum (NAS) signal to a mobile radio communications device after a failed attempt by the mobile radio communications device to access a mobile radio communications network via the network device, the network device being arranged to include within the NAS signal information indicating to the mobile radio communications device which one of: (i) an existing NAS signalling connection; or (ii) a new NAS signalling connection, the radio mobile communications device should employ to attempt re-establishment of connection with the network device.

The present invention may serve to reduce and/or inhibit the delays in a re-attach process as referred to above.

Optionally, the information indicating that re-establishment of connection is to be attempted using a new NAS signalling connection may be expressed as an inverse of the information indicating that re-establishment of connection is to be attempted using an existing NAS signalling connection.

Further optionally, upon receipt of a request for re-establishment of connection from the mobile radio communications device via one of: the existing NAS signalling connection; or the new NAS signalling connection, the network device is operative to accept the request and re-establish connection with the mobile radio communications device.

Optionally, after transmitting a NAS signal comprising information indicating to the mobile radio communications device that it should employ a new NAS signalling connection to attempt re-establishment of connection with the network device, the network device is operative to release the existing NAS signalling connection between the network device and the mobile radio communications device.

Optionally, after transmitting a NAS signal comprising information indicating to the mobile radio communications device that it should employ an existing NAS signaling connection to attempt re-establishment of connection with the network device, the network device is operative to maintain the existing NAS signalling connection between the network device and the mobile radio communications device.

Yet further optionally, the information may comprise at least one flag in the NAS signal, and each at least one flag may comprise a bit of the NAS signal.

Optionally, the network device may be operable in a UMTS network and/or a LTE network.

According to another aspect of the present invention, there is provided a mobile radio communications device operative to receive a non-access stratum (NAS) signal from a mobile radio communications network device after a failed attempt by the mobile radio communications device to access a mobile radio communications network via the network device, the mobile radio communications device being arranged to identify within the NAS signal information indicating to the mobile radio communications device which one of: (i) an existing NAS signalling connection; or (ii) a new NAS signalling connection, the mobile radio communications device should employ to attempt re-establishment of connection with the network device.

Optionally, the information indicating that re-establishment of connection is, to be attempted using a new NAS signalling connection may be expressed as an inverse of the information indicating that re-establishment of connection is to be attempted using an existing NAS signalling connection.

Further optionally, upon receiving an indication that it should employ one of the existing NAS signalling connection; or the new NAS signalling connection to attempt re-establishment of connection with the network device, the device is operative to transmit a request for re-establishment of connection to the network device via one of the existing NAS signalling connection; or the new NAS signalling connection as determined from the indication.

Optionally, upon a determination that re-establishment of connection to the mobile radio communications network device is to be attempted using the new NAS signalling connection, the device is operative to await release of the existing NAS signalling connection by the network device and, upon such release, to establish a new NAS signalling connection with the network device.

Yet further optionally, the information may comprise at least one flag in the NAS signal, and each at least one flag may comprise a bit of the NAS signal.

Optionally, the device may be operable in a UMTS network and/or a LTE network.

According to another aspect of the present invention, there is provided a non-access stratum (NAS) signal including information for indicating to a mobile radio communications device which one of: (i) an existing NAS signalling connection between the mobile radio communications device and the mobile radio communications network device; or (ii) a new NAS signalling connection between the mobile radio communications device and the mobile radio communications network device, the mobile radio communications device should employ to attempt re-establishment of connection with the network device after a foiled attempt by the mobile radio communications device to access a mobile radio communications network via the network device.

Optionally, the information may comprise at least one flag in the NAS signal, and each at least one flag may comprise a bit of the NAS signal.

According to another aspect of the present invention, there is provided a method of transmitting, from a mobile radio communications network device, a non-access stratum (NAS) signal to a mobile radio communications device after a failed attempt by the mobile radio communications device to access a mobile radio communications network via the network device, the method including the step of adding to the NAS signal information indicating to the mobile radio communications device which, one of: (i) an existing NAS signalling connection between the mobile radio communications device and the mobile radio communications network device; or (ii) a new NAS signalling connection between the mobile radio communications device and the mobile radio communications network device, the mobile radio communications device should employ to attempt re-establishment of connection with the network device.

Optionally, the information indicating that re-establishment of connection is to be attempted using a new NAS signalling connection may be expressed as an inverse of the information indicating that re-establishment of connection is to be attempted using an existing NAS signalling connection.

The method may optionally further comprise the steps of accepting the request for re-establishment and re-establishing connection with the mobile radio communications device upon receipt of a request for re-establishment of connection from the mobile radio communications device via one of: the existing NAS signalling connection; or the new NAS signalling connection.

Optionally, the method may comprise the step of releasing the existing NAS signalling connection between the network device and the mobile radio communications device after transmitting a NAS signal comprising information indicating to the mobile radio communications device that it should employ a new NAS signalling connection to attempt re-establishment of connection with, the network device.

Optionally, the method may comprise the step of maintaining the existing NAS signalling connection between said network device and said mobile radio communications device after transmitting a NAS signal comprising information indicating to said mobile radio communications device that it should employ an existing NAS signalling connection to attempt re-establishment of connection with said network device.

Yet further optionally, the information may comprise at least one flag in the NAS signal, and each at least one flag may comprise a bit of the NAS signal.

According to another aspect of the present invention, there is provided a method of receiving, at a mobile radio communications device, a non-access stratum (NAS) signal from a mobile radio communications network device after a failed attempt by the mobile radio communications device to access a mobile radio communications network via the network device, the method including the step of identifying within the NAS signal information indicating to the mobile radio communications device which one of: (i) an existing NAS signalling connection between the mobile radio communications device and the mobile radio communications network device; or (ii) a new NAS signalling connection between the mobile radio communications device and the mobile radio communications network device, the mobile radio communications device should employ to attempt re-establishment of connection with the network device.

Optionally, the information indicating that re-establishment of connection is to be attempted using a new NAS signalling connection may be expressed as an inverse of the information indicating that re-establishment of connection is to be attempted using an existing NAS signalling connection.

Optionally, upon receiving an indication that the mobile radio communications device should employ one of: the existing NAS signalling connection; or the new NAS signalling connection to attempt re-establishment of connection with the network device, transmitting a request for re-establishment of connection to the network device via one of: the existing NAS signalling connection; or the new NAS signalling connection as determined from the indication.

The method may optionally further comprise the steps of awaiting release of the existing NAS signalling connection by the network device and, upon such release, establishing a new NAS signalling connection with the network device, upon determining that re-establishment of connection to the mobile radio communications network device is to be attempted using the new NAS signalling connection.

Yet further optionally, the information may comprise at least one flag in the NAS signal, and each at least one flag may comprise a bit of the NAS signal.

According to another aspect of the present invention, there is provided a computer program, computer program product or computer readable medium, comprising instructions for enabling a mobile radio communications network device to carry out a method as described above.

According to another aspect of the present invention, there is provided a computer program, computer program product or computer readable medium, comprising instructions for enabling a mobile radio communications device to carry out a method as described above.

According to another aspect of the present invention, there is provided a mobile radio communications device including a computer program, computer program product or computer readable medium as described above.

According to another aspect of the present invention, there is provided a mobile radio communications device including a computer program, computer program product or computer readable medium as described above.

According to another aspect of the present invention, there is provided a mobile communications system including a mobile radio communications network device as described above and a mobile radio communications device as described above.

BRIEF DESCRIPTION OF THE DRAWINGS

One or more embodiments of the invention are described further hereinafter, by way of example only, with reference to the accompanying drawings in which.

EMBODIMENTS FOR CARRYING OUT THE INVENTION

A re-attach process may be required to re-establish connection between a UE and a network device if the UE has, for example, been inactive for a period of time, and has become detached from the network by the network device. This can happen, for example, due to inter-node mobility, or because the network device has implicitly detached the UE due to no communication from the UE to the network device for a period of time. If the UE has become detached from the network, then it is operative to initiate re-attachment to the network by sending an attach, request to the network device. This can happen, for example, at the time when the UE is sending a service request or a tracking area update (TAU) request to the network device.

Figure 1:
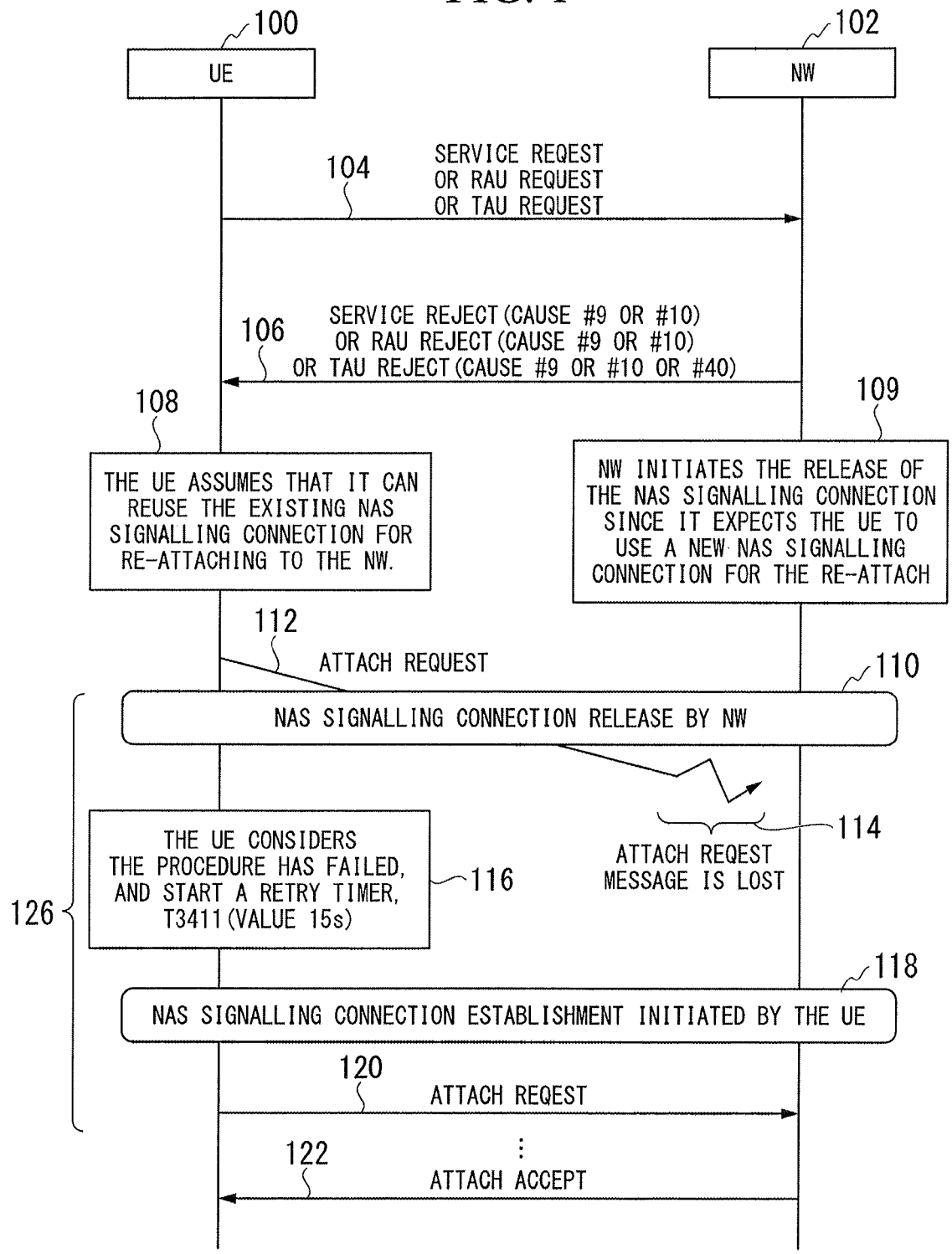
FIG. 1 is a schematic illustration of a flow of messages and/or data between mobile radio communications device User Equipment (UE) and a mobile radio communications network device during a process to re-establish connection between the UE and mobile radio communications network device in a current first instance.

FIG. 1 schematically illustrates mobile radio communications user equipment (UE) 100 and a mobile radio communications network device 102 (hereinafter "network device") and the flow of messages and/or data between the UE 100 and the network device 102 during a process to re-establish connection between the UE and mobile radio communications network device (hereinafter "re-attach process") in a current first instance.

A re-attach process commences with a request 104 sent from the UE 100 to the network device 102. For the reasons described above, the network device 102 is unable to recover a context for the UE 100, or has lost the context for the UE 100, and is therefore unable to carry out the request 104 received from the UE 100. The network device 102 indicates to the UE 100 that it cannot carry out the request by sending a rejection 106 to the UE 100.

The rejection 106 may comprise a service reject in UMTS (under causes #9 or #10, as described in 3GPP TS 24.008), or a service reject in LTE (under causes #9 or #10, as described in 3GPP TS 24.301) or a TAU reject in LTE (under causes #9, #10 or #405 as described in 3GPP TS 24.301 or a RAU reject in UMTS (under causes #9 or #10, as described in 3GPP TS 24.008).

The UE 100 is operative to implement a re-attach process using an existing NAS signalling connection between the UE 100 and the network device 102. Thus, upon reception of the rejection 106, the UE 100 determines 108 that it can reuse the existing NAS signalling connection for the re-attach process and sends a request for re-establishment of connection 112 to the network device 102.

However, the network device 102 is operative to coordinate a re-attach process using a different implementation than the UE 100. In this particular example, the network device 102 is operative to coordinate a re-attach process using a new NAS signalling connection. Thus, after transmitting the rejection 106 to the UE 100, and around the same time that UE 100 determines 108 that it should send the request 112, the network device 102 initiates release 110 of the existing NAS signalling connection. Thus, the request 112 for re-establishment of connection, which is sent by the UE 100 using the existing NAS signalling connection is not received by the network device 102 because the NAS signalling connection was released by the network device 102 before the request reached the network device. The request 112 is therefore lost 114. The UE 100, having not received any acknowledgement from the network device 102, eventually determines 116 that the request 112 has failed to reach the network device 102. Upon such determination, the UE 100 is operative to initiate a timer. The UE 100 will postpone the re-attach until a predetermined amount of time (e.g. 15 seconds), as measured by the time, has elapsed. When the predetermined amount of time has elapsed, the UE 100 initiates 118 establishment of a new NAS signalling connection with the network device 102. After establishment of a new NAS signalling connection between the UE 100 and the network device 102, the UE 100 transmits 120 another request for re-establishment of connection to the network device 102.

This attempt at re-establishing a connection with the network device 102 is successful and the network device 102 acknowledges the success by transmitting an accept message 122 to the UE 100.

There is a delay 126 in this process between the sending of request 112 and the sending of request 120.

Figure 2:
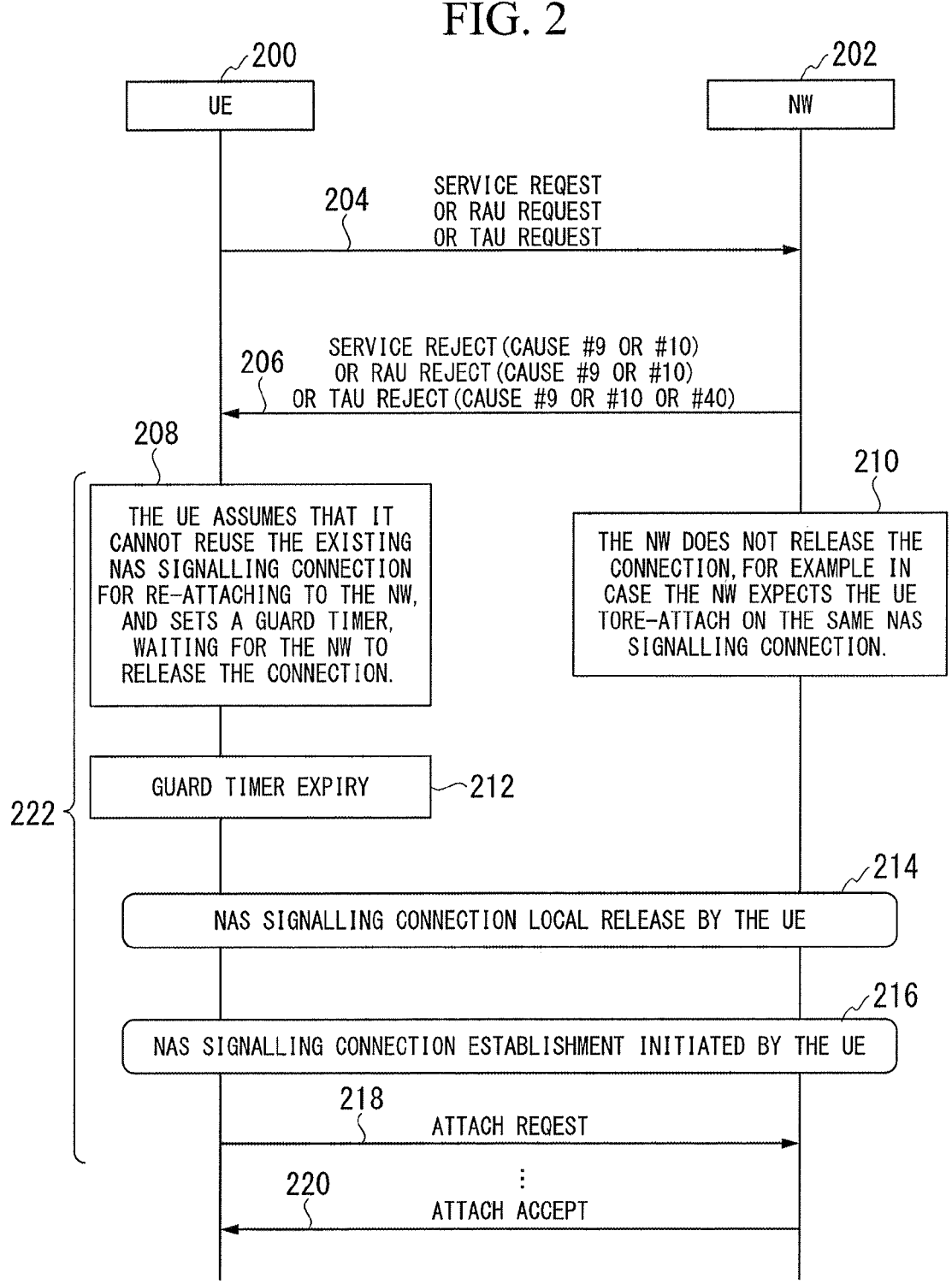
FIG. 2 is a schematic illustration of a flow of messages and/or data between mobile radio communications device User Equipment (UE) and a mobile radio communications network device during a process to re-establish connection between the UE and mobile radio communications network device in a current second instance.

FIG. 2 schematically illustrates mobile radio communications user equipment (UE) 200 and a mobile radio communications network device 202 (hereinafter "network device") and the flow of messages and/or data between the UE 200 and the network device 202 during a process to re-establish connection between the UE and mobile radio communications network device (hereinafter "re-attach process") in a current second instance.

A re-attach process commences with a request 204 for access sent from the UE 200 to the network device 202. This request 204 along with, a rejection 206 sent by network device 202 to UE 200 correspond to request 104 and rejection 106 respectively as described above in relation to FIG. 1.

The UE 200 is operative to implement a re-attach process using a new NAS signalling connection between the UE 200 and the network device 202. Thus, upon reception of the rejection 206, the UE 200 waits for the network device to release the existing NAS signalling connection (because it is not operative to use the existing NAS signalling connection). The UE 200 also sets 208 a guard timer. In some instances, the network device 202 may not be operative to release the existing NAS signalling connection (210). For example, it may be operative to receive a request for re-establishment of connection via the same existing NAS signalling connection. If no release occurs within a predetermined period of time from receipt of the rejection 206 by the UE 200 (as measured 212 by the guard timer), the UE 200 is operative to locally release 214 the existing NAS signalling connection. When the existing NAS signalling connection has been released, the UE 200 is operative to establish 216 a new NAS signalling connection with the network device 202.

After establishment of a new NAS signalling connection between the UE 200 and the network device 202/ the UE 200 transmits 218 another request for re-establishment of connection to the network device 202.

This attempt at re-establishing a connection with the network device 202 is successful and the network device 202 acknowledges the success by transmitting an accept message 220 to the UE 100.

Again, the time between an initial attempt at re-establishment of connection and a subsequent attempt introduces a delay 222 into the re-attach process.

Figure 3:
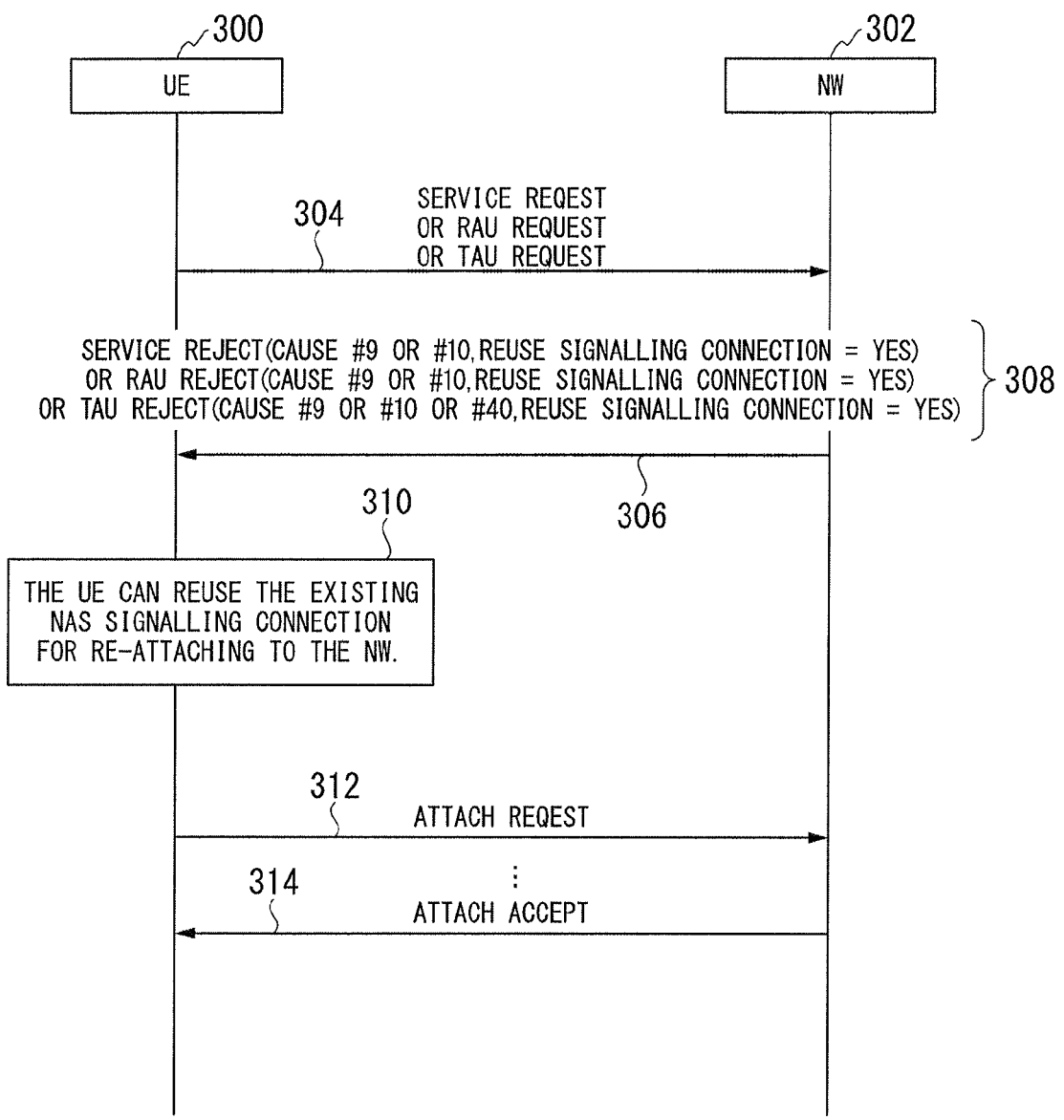
FIG. 3 is a schematic illustration of a flow of messages and/or data between mobile radio communications device User Equipment (UE) and a mobile radio communications network device during a process to re-establish connection between the UE and mobile radio communications network device in accordance with a first one or more embodiments of the present invention.

FIG. 3 is a schematic illustration of a flow of messages and/or data between mobile radio communications device User Equipment (UE) 300 and a mobile radio communications network device 302 (hereinafter "network device") during a process to re-establish connection between the UE 300 and network device 302 in accordance with a first one or more embodiments of the present invention.

A re-attach process commences with a request 304 for access sent from the UB 300 to the network device 302. This request 304 corresponds to requests 104 and 204 as described above in relation to FIGS. 1 and 2.

Again, the network device 302 is unable to recover a context for the UE 300 (e.g. for the reasons described above), or has lost the context for the UE 300, and is therefore unable to carry out the request 304 received from the UE 300. Thus, the attempt by the UE 300 to access the network via network device 302 fails. The network device 302 indicates to the UE 300 that it cannot carry out the request by sending a rejection 306 to the UE 100. The rejection 306 may comprise a service reject in UMTS (under causes #9 or #10, as described in 3GPP TS 24.008), or a service reject in LTE (under causes #9 or #10, as described in 3GPP TS 24.301) or a TAU reject in LTE (under causes #9, #10 or #40, as described in 3GPP TS 24.301) or a RAU reject in UMTS (under causes #9 or #10, as described in 3GPP TS 24.008).

In the illustrated arrangement, the rejection 306 includes an indicator 308 which comprises information from the network device 302 indicating to the UE 300 the manner by which it can attempt re-establishment of connection with the network device 302. The indicator 308 comprises information for directing the UE 300 to employ an existing NAS signalling connection for the re-attach process.

Upon receipt of the rejection 306, the UE 300 is operative to extract the information contained within the indicator 308 and determine 310 the method by which it should attempt a re-attach process, i.e. in the illustrated arrangement, via use of the existing NAS signalling connection.

The UE 300, once having made the determination that it should reuse the existing NAS signalling connection, the UE 300 transmits 312 another request for re-establishment of connection to the network device 302.

This attempt at re-establishing a connection with the network device 302 is successful and the network device 302 acknowledges the success by transmitting an accept message 314 to the UE 300.

The provision, in the rejection 306, of an indicator 308 which contains information for directing the UE 300 to employ a particular connection to attempt a re-attach process, may reduce and/or inhibit delays in re-attach processes, for example, such as those illustrated in FIGS. 1 and 2.

Figure 4:
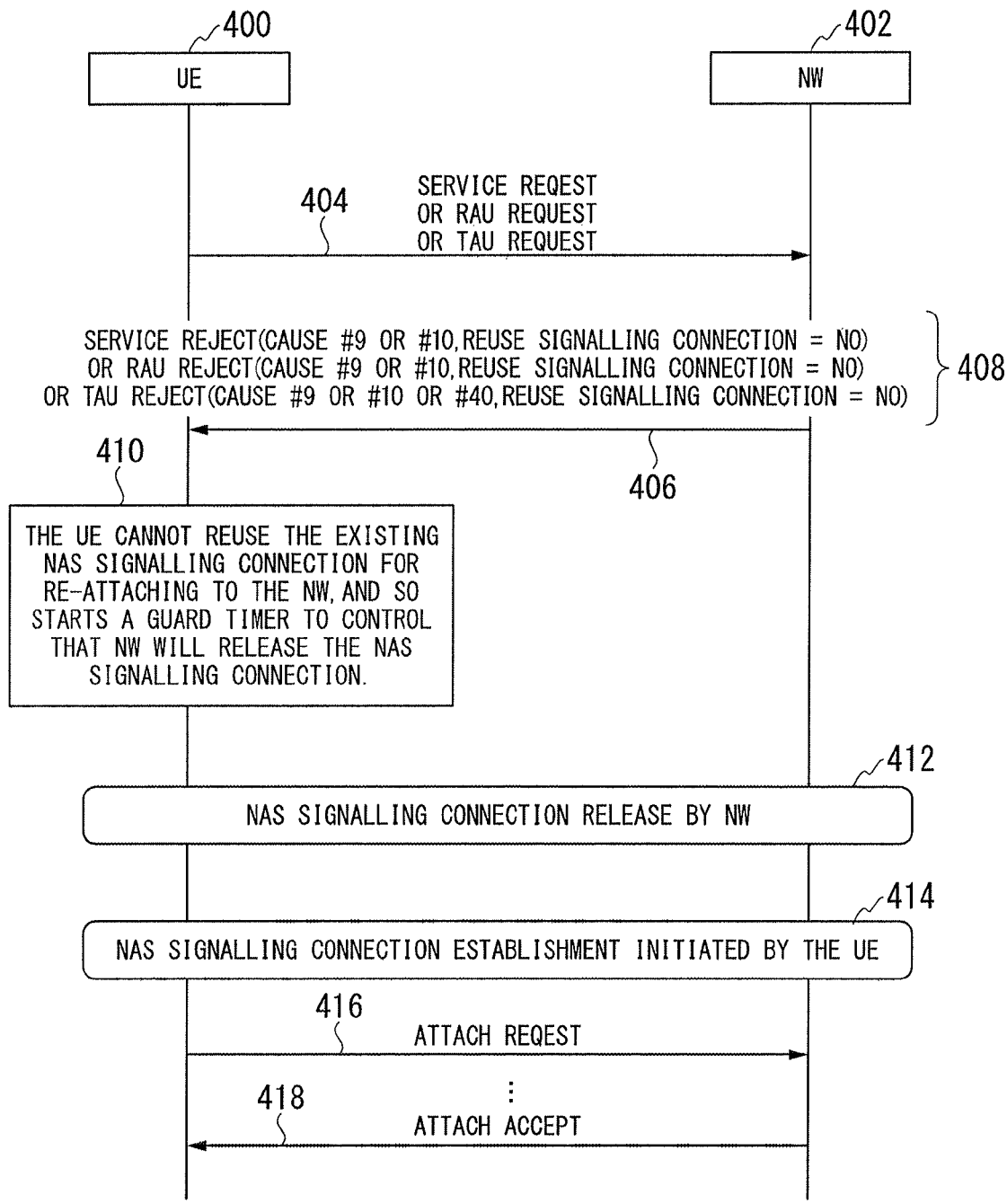
FIG. 4 is a schematic illustration of a flow of messages and/or data between mobile radio communications device User Equipment (UE) and a mobile radio communications network device during a process to re-establish connection between the UE and mobile radio communications network device in accordance with a second one or more embodiments of the present invention.

FIG. 4 is a schematic illustration of a flow of messages and/or data between mobile radio communications device User Equipment (UE) 400 and a mobile radio communications network device 402 (hereinafter "network device") during a process to re-establish connection between the UE 400 and network device 402 in accordance with a second one or more embodiments of the present invention.

A re-attach process commences with a request 404 for access sent from the UE 400 to the network device 402. This request 404 corresponds to requests 104, 204 and 304 as described above in relation to FIGS. 1, 2 and 3.

Again, the network device 402 is unable to recover a context for the UE 400 (e.g. for the reasons described above), or has lost the context for the UE 400 and is therefore unable to carry out the request 404 received from the UE 400. Thus, the attempt by the UE 400 to access the network via network device 402 fails. The network device 402 indicates to the UE 400 that it cannot carry out the request by sending a rejection 406 to the UE 100. The rejection 406 may comprise a service reject in UMTS (under causes #9 or #10, as described in 3GPP TS 24.008), or a service reject in LTE (under causes #9 or #10, as described in 3GPP TS 24.301) or a TAU reject in LTE (under causes #9, #10 or #40, as described in 3GPP TS 24.301) or a RAU reject in UMTS (under causes #9 or #10, as described in 3GPPTS 24.008).

In the illustrated arrangement, the rejection 406 includes an indicator 408 which comprises information from the network device 402 indicating to the UE 400 the manner by which it can attempt re-establishment of connection with the network device 402. The indicator 408 comprises information for directing the UE 400 to await release of an existing NAS signalling connection by the network device 402. Once the existing NAS signalling connection has been released by the network device 402, the TIE 400 can establish a new NAS signalling connection, and it is via this new NAS signalling connection that the UE 400 can attempt the re-attach process.

Upon receipt of the rejection 406, the UE 400 is operative to extract the information contained within the indicator 408 and determine 410 the method by which it should attempt a re-attach process, i.e. in the illustrated arrangement, to await release of existing NAS signalling connection before establishing a new NAS signalling connection with the network device 402.

The UE 400, once having made the determination that it should await release of the existing NAS signalling connection before establishing a new NAS signalling connection with the network device 402, waits for the release 412 of the existing NAS signalling connection by the network device 402.

When the existing NAS signalling connection has been released 412, the UE 400 is operative to establish 414 a new NAS signalling connection with, the network device 402.

After establishment of a new NAS signalling connection between the UE 400 and the network device 402, the UE 400 transmits 416 another request for re-establishment of connection to the network device 402.

This attempt at re-establishing a connection with the network device 402 is successful and the network device 402 acknowledges the success by transmitting an accept message 418 to the UE 400.

To avoid delays in the re-attach process, the network device 402 should release the existing NAS signalling connection promptly after sending the rejection 406 to the UE 400.

Again, the provision, in the rejection 406, of an indicator 408 which contains information for directing the UE 400 to employ a particular connection to attempt a re-attach process, may reduce and/or inhibit delays in re-attach processes, for example, such as those illustrated in FIGS. 1 and 2.

Thus, whilst some network devices require UE to reuse an existing connection, and other network devices require UE to use a new connection, the one or more embodiments described above, and as illustrated in FIGS. 3 and 4, may inhibit any ambiguity as to what the UE is required to do. That is, the UE is directed to employ an existing connection or use a new connection by the network device. Therefore, latency in the re-attach process may be reduced and/or inhibited, for example, when a re-attach request is lost when the network device, unexpectedly to the UE, releases the existing NAS signalling connection, or whilst the UE awaits release of an existing signalling connection by the network device.

Figure 5:
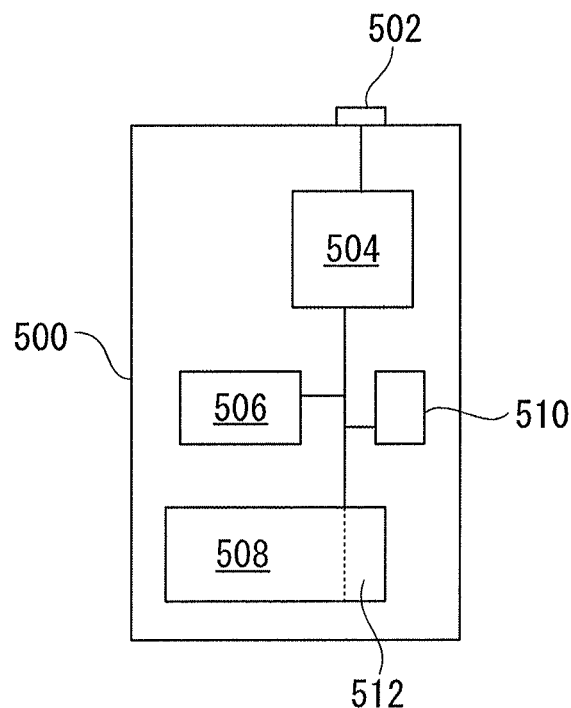
FIG. 5 is a schematic illustration of a mobile radio communications network device according to first or second one or more embodiments of the present invention.
Figure 6:
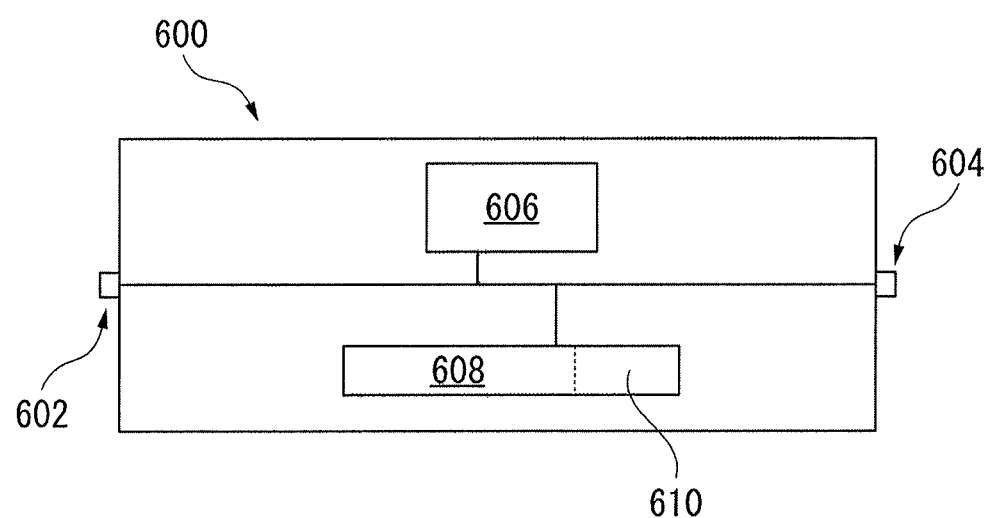
FIG. 6 is a schematic illustration of mobile radio communications User Equipment (UE) according to first or second one or more embodiments of the present invention.

With reference to FIG. 5 there is provided a schematic illustration of a mobile radio communications device User Equipment (UE) 500 in the form of a mobile phone handset and having a standard air interface comprising antenna 502 and reception/transmission 504 functionally connected within the handset to memory storage 506, a processor 508 and a user interface 510.

Within the illustrated embodiment, the processor 508 includes an indicator extraction function 512 which serves to extract information from the indicator (e.g. 308 of FIG. 3 or 408 of FIG. 4) received in a rejection from a network device to allow the processor 508 to determine the appropriate manner for conducting the re-attach process.

The present invention also provides for a network device 600 arranged, for example, with an interface 602 to a Radio Network Controller and an interface 604 to a GSM network via a Base Station Controller (BSC), wherein the network device 600 includes memory 606 and a processor 608 in which the processor 608 can include an indicator inclusion function 610 and adding an indicator (e.g. 308 of FIG. 3 or 408 of FIG. 4) to a rejection prior to the rejection being sent from the network device 600 to UE.

The information comprising the indicators as described above may be contained within one or more bits of a signal comprising the rejection (i.e. 306 of FIG. 3 or 406 of FIG. 4). For example, the indicator could comprise a flag within the signal comprising the rejection.

Although the above one or more embodiments of the present invention have described various rejection types which comprised a service reject (under causes #9 or #10) or a TAU reject (under causes #9, #10 or #40) or a RAU reject (under causes #9 or #10), the one or more embodiments may also be suitable for arrangements where other rejections are issued. For example, the one or more embodiments may be suitable in the case of a network device initiated detach procedure (LTE and/or UMTS), and where a "detach" request from the network device to the UE would contain an indicator comprising information for directing the UE to proceed in the manner described above, and as illustrated in one of FIG. 3 or 4. Further, the one or more embodiments may be suitable in any case where the network device requires the UE to perform a re-attach process.

Of course, it should be appreciated that the present invention is not restricted to the details of the forgoing description and can be employed, as appropriate, in relation to any NAS signalling message and, in particular, any signalling message employed as part of the location updating procedure.

INDUSTRIAL APPLICABILITY

The present invention relates to mobile radio communications, a mobile radio communications device, and a mobile radio communications network device. The mobile radio communications in accordance with the present invention is effective to transmit and receive signalling for the establishment/maintenance of network connections.

The invention claimed is:

1. A mobile radio communications network device comprising an interface and a processor configured to transmit a non-access stratum (NAS) signal to a mobile radio communications device which fails in an attempt to access a mobile radio communications network due to a rejection to one of a service request, a tracking area update (TAU) request, and a routing area update (RAU) request,
wherein the processor incorporates into the rejection an indicator which instructs the mobile radio communication device to use an existing NAS signaling connection or a new NAS signaling connection so as to attempt re-establishment of connection via the mobile radio communications network.

2. The mobile radio communications network device as claimed in claim 1, wherein after transmitting the NAS signal instructing said mobile radio communications device to use the new NAS signaling connection so as to attempt re-establishment of connection, the processor releases the existing NAS signaling connection with said mobile radio communications device.

3. The mobile radio communications network device as claimed in claim 1, wherein after transmitting the NAS signal instructing said mobile radio communications device to use the existing NAS signaling connection so as to attempt re-establishment of connection, the processor maintains the existing NAS signaling connection between said network device and with said mobile radio communications device.

4. A mobile radio communications device comprising a processor and a receiver/transmitter configured to receive a non-access stratum (NAS) signal from a mobile radio communications network device when failing in an attempt to access the mobile radio communications network due to a rejection to one of a service request, a tracking area update (TAU) request, and a routing area update (RAU) request, wherein the processor extracts from the rejection an indicator which instructs said mobile radio communications device to use an existing NAS signaling connection or a new NAS signaling connection so as to attempt re-establishment of connection via the mobile radio communications network.

5. The mobile radio communications device as claimed in claim 4, wherein upon extracting the indicator from the rejection, the receiver/transceiver transmits a request for re-establishment of connection to the mobile radio communications network device via one of the existing NAS signaling connection or the new NAS signaling connection.

6. The mobile radio communications device as claimed in claim 4, wherein upon determining to attempt the re-establishment of connection using the new NAS signaling connection, the processor awaits release of the existing NAS signaling connection and then establishes the new NAS signaling connection.

7. A transmitting method of transmitting a non-access stratum (NAS) signal from a mobile radio communications network device to a mobile radio communications device which fails in an attempt to access a mobile radio communications network due to a rejection to one of a service request, a tracking area update (TAU) request, and a routing area update (RAU) request, wherein the transmitting method includes a step of adding to the NAS signal information an indicator which instructs the mobile radio communications device to use an existing NAS signaling connection or a new NAS signaling connection so as to attempt re-establishment of connection with the mobile radio communications network device.

8. The transmitting method as claimed in claim 7, further comprising a step of re-establishing connection with the mobile radio communications device upon receipt of a request for re-establishment of connection from the mobile radio communications device via one of the existing NAS signaling connection or the new NAS signaling connection.

9. The transmitting method as claimed in claim 7, further comprising a step of releasing the existing NAS signaling connection after transmitting the NAS signal including the indicator which instructs the mobile radio communications device to use the new NAS signaling connection so as to attempt re-establishment of connection.

10. The transmitting method as claimed in claim 7, further comprising a step of maintaining the existing NAS signaling connection after transmitting the NAS signal including the indicator which instructs the mobile radio communications device to use the existing NAS signaling connection so as to attempt re-establishment of connection.

11. A receiving method adapted to a mobile radio communications device to receive a non-access stratum (NAS) signal from a mobile radio communications network device when failing in an attempt to access a mobile radio communications network due to a rejection to one of a service request, a tracking area update (TAU) request, and a routing area update (RAU) request, wherein said receiving method includes a step of incorporating into the NAS signal an indicator which instructs the mobile radio communications device to use an existing NAS signaling connection or a new NAS signaling connection so as to attempt re-establishment of connection with said network device.

12. The receiving method as claimed in claim 11, wherein upon receiving the indicator, transmitting a request for re-establishment of connection to the network device via one of the existing NAS signaling connection or the new NAS signaling connection according to the indicator.

13. The receiving method as claimed in claim 11, further comprising a step of awaiting release of the existing NAS signaling connection and then establishing the new NAS signaling connection upon determining that re-establishment of connection to the mobile radio communications network device is to be attempted using the new NAS signaling connection.

14. A non-transient computer readable storage medium storing instructions which cause a computer to serve as the mobile radio communications network device according to the transmitting method as claimed in claim 7.

15. A non-transitory computer readable storage medium storing instructions which cause a computer to serve as the mobile radio communications device according to the receiving method as claimed in claim 11.

16. A mobile communications system including the mobile radio communications network device as claimed in claim 1 and the mobile radio communications device as claimed in claim 4.

* * * * *